US007082113B1

(12) United States Patent
Matusevich

(10) Patent No.: US 7,082,113 B1
(45) Date of Patent: Jul. 25, 2006

(54) TDMA COMMUNICATION SYSTEM AND METHOD INCLUDING DISCONTINUOUS MODULATION FOR REDUCING ADJACENT AND CO-CHANNEL INTERFERENCE

(75) Inventor: Alex Matusevich, Morris Plains, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/156,761

(22) Filed: Sep. 18, 1998

(51) Int. Cl.
*H04Q 7/00* (2006.01)
*H04J 3/00* (2006.01)

(52) U.S. Cl. .................................... 370/330; 370/336

(58) Field of Classification Search ................ 370/311, 370/314, 318, 321, 336, 337, 347, 433, 436, 370/437, 442, 478, 498, 330; 455/115, 127, 455/522

See application file for complete search history.

(56) References Cited

U.S. PATENT DOCUMENTS 5,422,932 A * 6/1995 Kay et al. ................... 455/452
5,535,207 A * 7/1996 Dupont ....................... 370/433
5,682,417 A * 10/1997 Nitta .......................... 370/311
5,737,695 A * 4/1998 Lagerqvist et al. ........... 455/79

FOREIGN PATENT DOCUMENTS

EP 0865177 A2 9/1998

* cited by examiner

*Primary Examiner*—Andrew C. Lee

(57) ABSTRACT

In a time division multiple access communication system, adjacent and co-channel interference are reduced by discontinuing or shutting off modulation of carrier frequency signals during inactive time slots so that transmitted power of carrier frequency signals are reduced. Also, the time slots and carrier frequency signals are organized so that each carrier frequency signal has the least amount of time slots designated as active time slots. The time slots are designated so that the respective same time slots of adjacent carrier frequency signals are not concurrently designated as active time slots.

10 Claims, 3 Drawing Sheets

PSTN
60
40
ECP
403
MEMORY
μp
401
50
MOBILE
101
109
MOD
107
μp
MEMORY
105
DEMOD
103
10
CELL 1
201
209
MOD
207
μp
MEMORY
205
DEMOD
203
20
CELL 2
301
309
MOD
307
μp
MEMORY
305
DEMOD
303
30
CELL 3

TDMA COMMUNICATION SYSTEM AND METHOD INCLUDING DISCONTINUOUS MODULATION FOR REDUCING ADJACENT AND CO-CHANNEL INTERFERENCE

FIELD OF THE INVENTION

1. Technical Field

The present invention relates to a TDMA communication system that reduces TDMA cell site generated adjacent and co-channel interference through discontinuous modulation.

2. Description of the Background Art

Voice quality and channel capacity are factors which have an influence on frequency reuse recommendations in a time-division multiple access (TDMA) mobile communication system. Determination of frequency reuse is a trade-off between voice quality and channel capacity since as channel capacity increases, interference between channels also increases resulting in reduced voice quality. Recovery of voice and data with good bit error rate and frame error rate becomes more difficult as interference increases.

FIG. 1 illustrates a typical TDMA communication system including mobile unit 10 and cell sites 1A–3A and 1B–3B. Mobile 10 receives TDMA carrier frequency signal $f_2$ from cell 2A. Mobile 10 receives co-channel interference generated in view of carrier frequency signal $f_2$ transmitted from cell 2B. Mobile 10 also receives adjacent channel interference from carrier frequency signals $f_1$ and $f_3$ transmitted from cells 1A and 3A, and any other carrier frequency signals having frequencies closely spaced relative to carrier frequency signal $f_2$ transmitted by cell 2A. Conversely, carrier frequency signal $f_2$ transmitted from cell site 2A creates co-channel interference which influences carrier frequency signal $f_2$ transmitted from a distant cell and adjacent channel interference which influences carrier frequency signals transmitted from distant cells that are closely spaced relative to carrier frequency signal $f_2$. As frequency reuse increases so that capacity of the TDMA communication system may increase, adjacent channel interference increases since cell sites must be located closer to each other. Co-channel interference also increases since carrier frequencies must be reused in cell sites that are spaced closer to each other.

In greater detail with reference to FIG. 1, carrier frequency signals $f_1$ and $f_2$ from respective cells 1A and 2A are one channel away from each other, or in other words separated only by at most 30 KHz of isolation with adjacent channel rejection of 60 dB. Thus, carrier frequency signal $f_1$ generates adjacent channel interference with respect to carrier frequency signal $f_2$, and vice-versa. Typically, carrier frequency signals $f_2$ and $f_3$ from respective cells 2A and 3A do not create significant adjacent channel interference with respect to each other since the carrier frequency signals are separated by at least 60 KHz of isolation with adjacent channel rejection of 120 dB.

FIG. 2 illustrates a conventional TDMA transmission scheme including time-division multiplexed carrier frequency signals $f_1$–$f_4$. The downlink transmission from a cell site to mobile users 1–3 are time-multiplexed on carrier frequency signal $f_1$ into respective time slots. The downlink transmissions from cell sites to mobile users 4–6, 7–9 and 10–12 are respectively time-multiplexed on carrier frequency signals $f_2$–$f_4$ in respective time slots. The time slots repeat cyclically. The uplink transmissions from the mobile users to the cell sites follow the timing and frequency of the respective downlink transmissions. For example, an uplink transmission from a mobile follows 45 symbols after completion of the downlink transmission on a carrier frequency signal spaced 45 MHz from the carrier frequency signal of the respective downlink transmission.

In accordance with the current TDMA standards, a carrier frequency signal is modulated by data using a $\pi/4$ DQPSK modulation scheme. A time slot of a carrier frequency signal that is modulated with voice or data is referred to as an active time slot. However, in further accordance with current TDMA standards, the carrier frequency signal of the downlink transmission is modulated regardless of whether there is data or voice to be transmitted from the cell site to the mobile. Inactive time slots of the carrier frequency signals that are not modulated with voice or data are modulated with random bits provided from a T1 switch within the central office or the executive control processor (ECP).

In greater detail, FIG. 3 illustrates the structure of a conventional downlink carrier frequency signal transmitted from a cell site base station to a mobile in a TDMA communication system. The carrier frequency signal includes three time slots each including a sync portion, a control and data portion, and a CDL (coded digital control channel locator) portion. The sync portion of the carrier frequency signal is modulated by the corresponding sync word for the time slot as assigned by the ECP. The control and data portion of the carrier frequency signal is modulated by control information and voice or data provided by the ECP. The CDL portion of the carrier frequency signal is modulated by the CDL data, which is also provided by the ECP. Each time slot has a duration of 6.67 msec and is repeated every 20 msec. Each time slot of a carrier frequency signal is modulated and transmitted at full power regardless of whether the time slot is active or inactive. If the time slot is inactive, the control and data portion of the carrier frequency signal is modulated with random bits supplied from the T1 switch within the ECP.

Accordingly, in a conventional TDMA system, all time slots of a carrier frequency signal are modulated and transmitted at the same power level regardless of whether the time slots of the carrier frequency signal are active or inactive. The cell site is therefore constantly transmitting power for each time slot of a carrier frequency signal on the downlink transmission and creating adjacent and co-channel interference regardless of whether the time slots may be inactive.

SUMMARY OF THE INVENTION

The present invention reduces adjacent and co-channel interference within a TDMA communication system by discontinuing or shutting off modulation of inactive time slots of transmitted carrier frequency signals. Carrier frequency signals and time slots are also organized to reduce adjacent and co-channel interference by minimizing the number of active time slots across all available carrier frequencies.

DETAILED DESCRIPTION OF PREFERRED EMBODIMENTS

Figure 4:
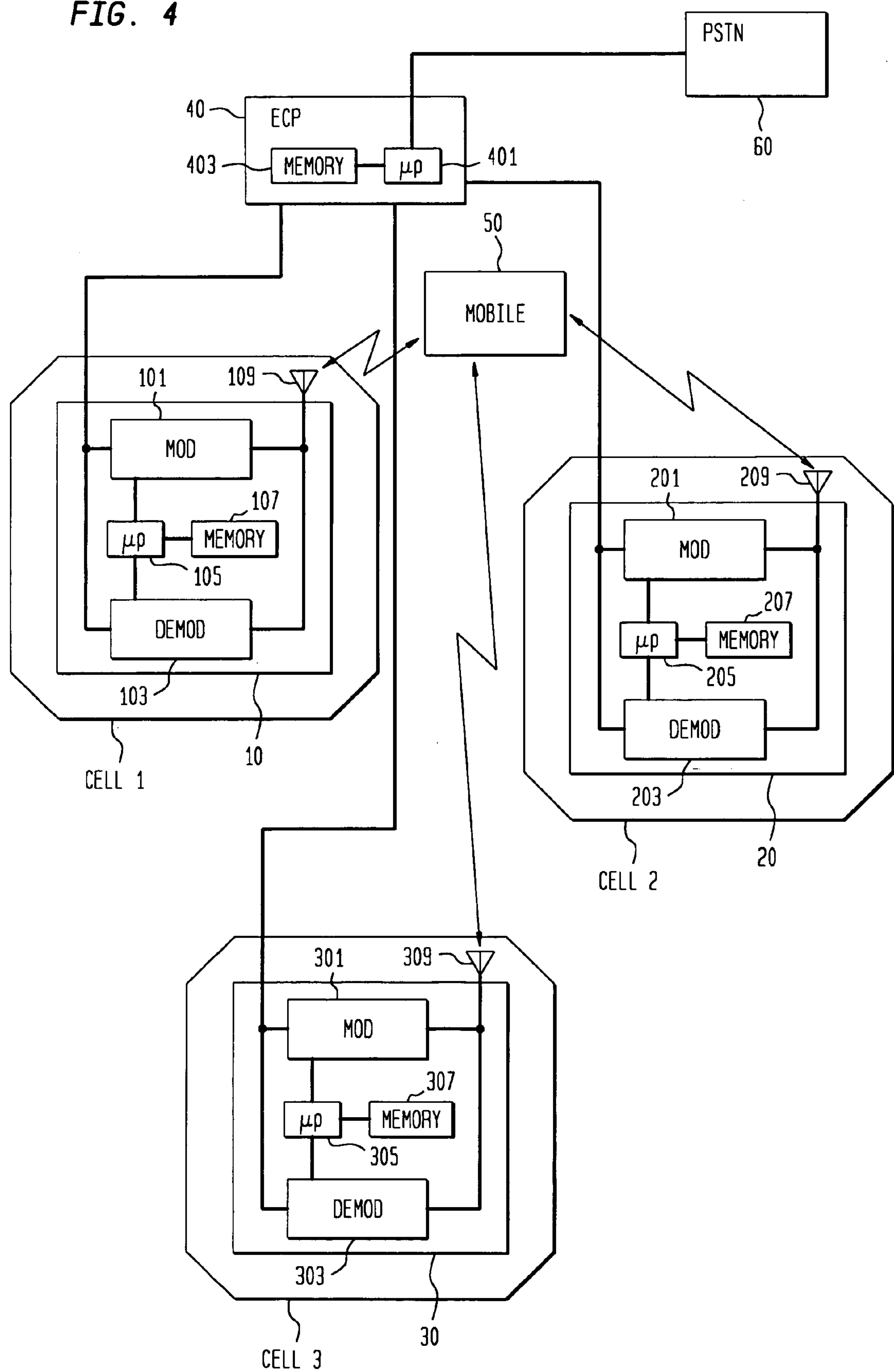
FIG. 4 illustrates a TDMA communication system of a preferred embodiment of the invention.

FIG. 4 illustrates a TDMA communication system of a preferred embodiment of the invention. Executive control processor (ECP) 40 is wired to base stations 10, 20 and 30 located within respective cells 1–3. Although three respective cells 1–3 are illustrated, the TDMA communication system may include any number of cells. ECP 40 routes or switches voice or data from public switched telephone network (PSTN) 60 to mobile 50 via any of base stations 10, 20 and 30 and also routes voice or data from mobile 50 to PSTN 60, or to any other mobile within the network, via base stations 10, 20 and 30. ECP 40 designates the carrier frequency and time slots that the voice or data are transmitted in a downlink transmission from a base station to mobile 50, as will be described subsequently. ECP 40 includes microprocessor 401 which functions to control operation of the TDMA communication system in accordance with software programming stored within memory 403.

Base station 10 as illustrated in FIG. 4 includes modulator 101, demodulator 103, microprocessor 105, memory 107 and antenna 109 configured in a known manner. Modulator 101 modulates voice or data provided from ECP 40 using a n/4 DQPSK modulating scheme and provides the modulated data to antenna 109 for wireless transmission to mobile 50 for example. Demodulator 103 demodulates a signal received by antenna 109 using a π/4 DQPSK demodulation scheme and provides the demodulated voice or data to ECP 40 for routing to either PSTN 60 or to any of base stations 10, 20 and 30 for transmission to a mobile station. Modulator 101 and demodulator 103 may be any conventional modulator and demodulator and may function in any conventional duplexing mode with antenna 109 to enable transmission and reception of RF signals by base station 10. Base station 10 also includes microprocessor 105 which controls operation of modulator 101 and demodulator 103 in accordance with software programming stored within memory 107. Base stations 20 and 30 are configured in a similar manner as base station 10.

In a preferred embodiment of the invention, modulation of the carrier frequency signal during inactive time slots is discontinued or shut off. In greater detail, the CDL data and the sync word are the two identifiers that all mobiles require to know what carrier frequency signal and what time slot of the carrier frequency signal to communicate on. However, the sync word portion and the CDL portion of a time slot account for a small portion of the 6.67 msec time slot. By discontinuing modulation of the carrier frequency signal during the control and data portion of an inactive time slot which is conventionally modulated with useless random bits, and modulating the carrier frequency signal only during the sync and CDL portions of the inactive time slot, the effective average transmitted power of the carrier frequency signal can be reduced by approximately one third. Considering average power and that each time slot of a carrier frequency signal is effectively one third the total power of the carrier frequency signal, discontinuing modulation of the carrier frequency during an inactive time slot results in an approximately 2.7 dB reduction of transmitted power. Discontinuing modulation of the carrier frequency signal during two inactive time slots results in an approximately 5.0 dB reduction in transmitted power. Accordingly, in this aspect of the invention, transmitted power of carrier frequency signals is decreased by discontinuing modulation of the carrier frequency signal during inactive time slots such that adjacent and co-channel interference is thus reduced.

As described previously, in a conventional TDMA system random bits are provided from a T1 switch within the ECP, the carrier frequency signal is modulated within the base station with the random bits and the carrier frequency signal having modulated inactive time slots is transmitted at full power. In an embodiment of the invention, modulation of a carrier frequency signal at a base station is discontinued under control of the corresponding base station microprocessor. For example, modulator 101 of base station 10 is controlled by microprocessor 105 to discontinue or shut off modulation when random bits for an inactive time slot are supplied from ECP 40. Microprocessor 105 is programmed in accordance with software stored within memory 107 to monitor data type supplied from ECP 40 and to control modulator 101 to discontinue or shut off modulation upon recognition that an active call is not provided from ECP 40 for transmission to a mobile. Microprocessor 105 determines that an active call is not provided in accordance with preliminary set up information provided by ECP 40.

More particularly, modulation of the carrier frequency signal is discontinued or shut off during the control and data portion of an inactive time slot. Only the sync portion and the CDL portion of the inactive time slot are respectively modulated with the sync word and the CDL data provided by ECP 40 for the inactive time slot. Modulation is thus discontinued or shut off at the base station transmitter independently without supervision by ECP 40 to minimize power transmission and therefore reduce adjacent and co-channel interference.

Figure 1:
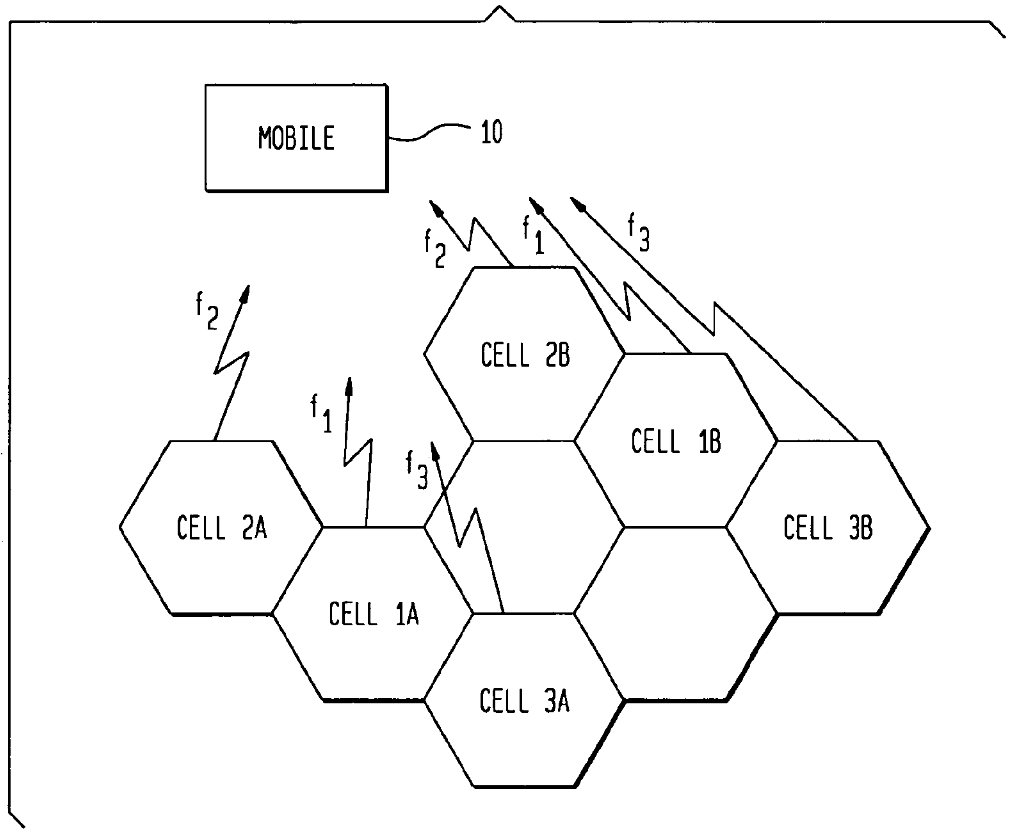
FIG. 1 illustrates a cell structure of a TDMA communication system.
Figure 2:
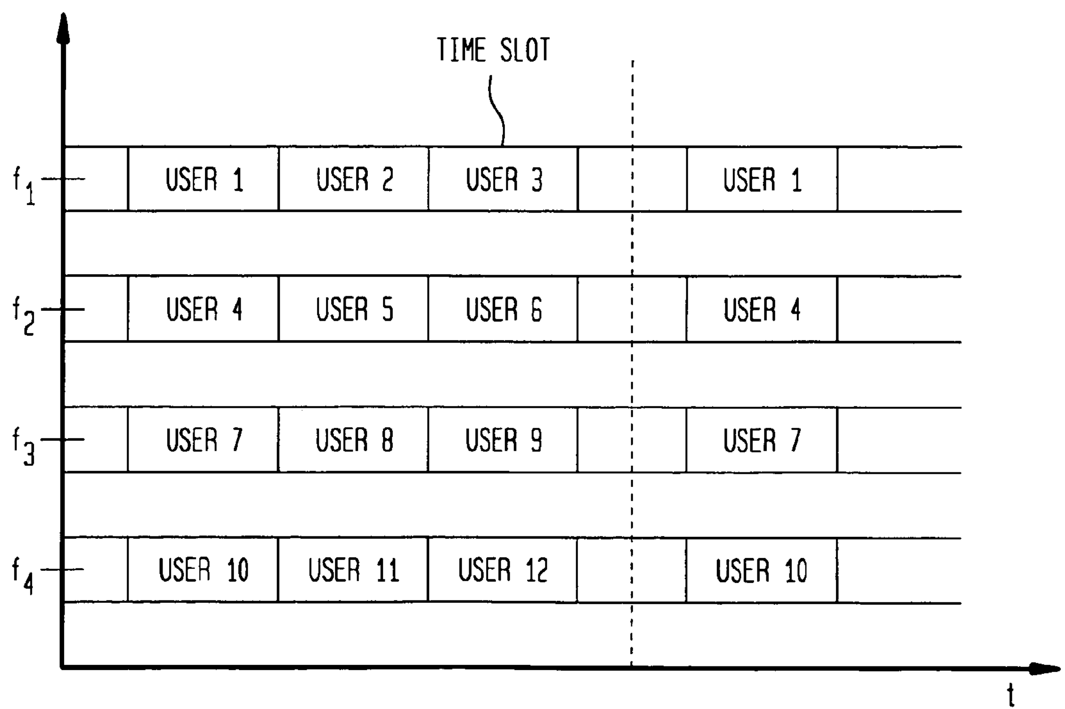
FIG. 2 illustrates time slot assignment of downlink carrier frequency signals in a conventional TDMA communication system.
Figure 3:
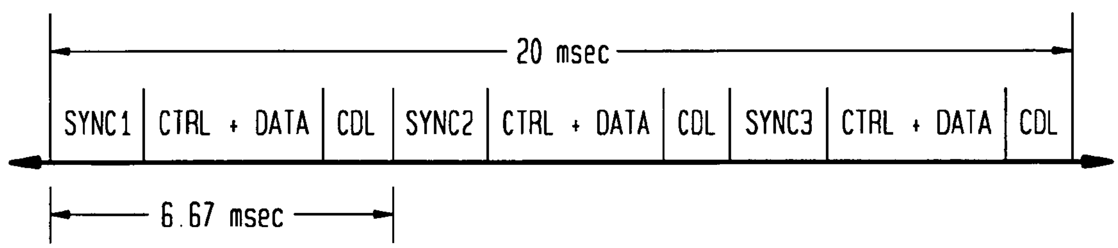
FIG. 3 illustrates a TDMA frame with three time slots.

An uplink transmission to a base station includes transmission from three different mobile stations. The current TDMA communication system standards thus allows for a three symbol guard band and three symbols of ramp bits between time slots on the uplink transmission. Since guard bands and ramp bits are allowed between time slots on the uplink transmission, modulation of the carrier frequency signals between time slots theoretically could be turned on and off virtually instantaneously without generating undesirable noise spikes on the carrier frequency signal. On the other hand, according to current TDMA standards as illustrated in FIGS. 2 and 3, the downlink transmission is contiguous without space for guard bands or ramp bits between time slots or between the control and data portion of a time slot and either of the sync portion or the CDL portion of the time slot. If modulation of a carrier frequency signal is turned on or off instantaneously during the time slots, undesirable noise spikes may be generated on the carrier frequency signal. Accordingly, in a preferred embodiment of the invention, modulator 101 of base station 10 for example is controlled by microprocessor 105 to turn modulation on and off gradually, preferably over at least a two-symbol period so that generation of noise spikes may be prevented.

In a further preferred embodiment of the invention, ECP 40 organizes the carrier frequency signals and time slots so that instead of designating all the time slots of a carrier frequency signal as active time slots, system usage is optimized and spread out over all the carrier frequency signals by designating the least amount of active time slots as possible on each of the carrier frequency signals. Adjacent and co-channel interference may thus be reduced since the transmitted power of the carrier frequency signals may be reduced. Also, the carrier frequency signals are organized so that the same respective time slots of adjacent carrier frequency signals are not designated as active time slots concurrently. Adjacent channel interference is thus reduced since at least 60 KHz of isolation with adjacent channel rejection of 120 dB may be created between respective time slots of adjacent channels. Since efficient organization of carrier frequency signals and active time slots in accordance with this embodiment reduces adjacent and co-channel interference, frequency reuse and channel capacity may be increased.

Figure 5:
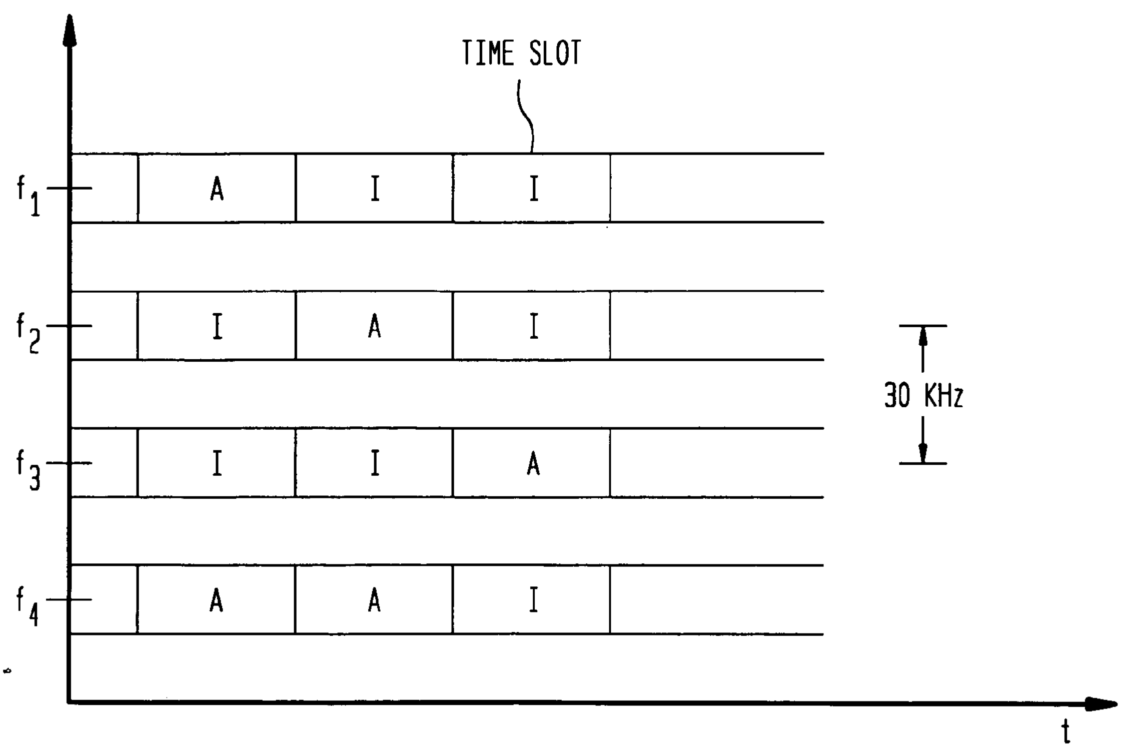
FIG. 5 illustrates organization of active and inactive time slots of carrier frequency signals of a preferred embodiment of the invention.

For example, in a TDMA communication system having carrier frequency signals $f_1$–$f_3$ each separated by 30 KHz as illustrated in FIG. 5, ECP 40 controls modulation of the carrier frequency signals of the downlink transmissions from base stations 10, 20 and 30 so that when the first time slot in carrier frequency signal $f_1$ is an active time slot (indicated as A), the second and third time slots in carrier frequency signal $f_1$ are inactive time slots (indicated as I) wherein modulation of the control and data portions of the carrier frequency signal $f_1$ is discontinued or shut off. Also, when the first time slot in carrier frequency signal $f_1$ is designated as an active time slot, ECP 40 designates the first time slot of adjacent carrier frequency signal $f_2$ as an inactive time slot. Either one of the second or third time slots of carrier frequency signal $f_2$ is designated by ECP 40 as an active time slot. In this example illustrated in FIG. 5, the second time slot of carrier frequency signal $f_2$ is designated as an active time slot and the third time slot is designated as an inactive time slot. Accordingly, ECP 40 organizes the carrier frequency signals so that active time slots are spread out and transmitted power of the carrier frequency signals are minimized, thus reducing adjacent and co-channel interference. Since respective time slots of adjacent carrier frequency signals are not concurrently active, high levels of isolation and adjacent channel rejection may be maintained, thus improving voice quality.

When service demand within the TDMA communication system is high, the number of available inactive time slots on the carrier frequency signals is decreased. In such a situation, ECP 40 may be unable to organize the carrier frequency signals such that each of the carrier frequency signals have only a single active time slot. As illustrated in FIG. 5, during a high service demand situation, ECP 40 organizes the carrier frequency signals of the downlink transmissions transmitted from the base stations such that carrier frequency signal $f_4$ for example has both the first and second time slots designated as active time slots. Adjacent and co-channel interference created by carrier frequency signal $f_4$ is thus decreased as the transmitted power of carrier frequency signal $f_4$ is reduced by a third. Also, since carrier frequency signal $f_4$ is separated from carrier frequency $f_2$ by at least 60 KHz of isolation with at least 120 dB rejection, adjacent channel interference between the respective second active time slots is minimized.

Accordingly, it is to be understood that an important aspect of this embodiment is that ECP 40 organizes the channels to the extent that each channel has the least amount of active time slots possible and that the same respective time slots of adjacent channel frequency signals are not concurrently active. As service demand increases, ECP 40 designates additional carrier frequency signals such that active time slots may be spread out over more carrier frequency signals while maintaining at least 60 KHz isolation and 120 dB rejection between respective active time slots. It is to be further understood that the organization of time slots and frequencies in FIG. 5 are exemplary only. The carrier frequencies may be organized in several different manners to achieve similar results. For example, all three time slots of carrier frequency signal $f_2$ may be designated as active time slots by ECP 40 as long as all the time slots of adjacent carrier frequency signals $f_1$ and $f_3$ are designated as inactive time slots.

It is also to be understood that reduction of adjacent and co-channel interference of the invention should not necessarily be limited in view of the corresponding figures and description. For instance, although base stations 10, 20 and 30 are illustrated in FIG. 4 as microprocessor-controlled in accordance with software programming stored within respective memories 107, 207 and 307, the corresponding programming for discontinuing or shutting off modulation and for gradually turning modulation on and off may be recorded on a computer recordable medium such as a floppy disk or CD ROM readable by respective microprocessors 105, 205 and 305. Similarly, although ECP 40 is illustrated as microprocessor-controlled in accordance with software programming stored within memory 403, the corresponding programming for organizing time slots and carrier frequency signals and for discontinuing supply of random bits to the base stations for inactive time slots may also be recorded on a computer recordable medium such as floppy disk or CD ROM readable by microprocessor 401.

Moreover, although base stations 10, 20 and 30 and ECP 40 are described as microprocessor-based, the microprocessors may be replaced by discrete circuits including various programmable gate arrays and corresponding circuitry which carry out the functions of the microprocessors. Also, modulation/demodulation is not limited to a π/4 DQPSK scheme. For instance, an 8 PSK or 16 PSK modulation/demodulation scheme may be used. The invention also should not necessarily be limited to a TDMA communication system but may also be applicable to a GSM (Global System for Mobile Communications) system using a GMSK (Gaussian Minimum Shift Keying) modulation/demodulation scheme.

What is claimed is:

1. A radio for a communication system, the radio transmitting a carrier signal having plural time slots designated as active and inactive time slots by a system controller, the radio comprising:

a modulator that modulates the carrier signal with transmit data and with frequency and time slot identifier data during active time slots when the transmit data is supplied from the system controller and discontinues modulation of the carrier signal with transmit data during inactive time slots when random bits are supplied form the system controller; and a transmitter that wirelessly transmits the carrier signal provided by said modulator.

2. The radio of claim 1, wherein said modulator discontinues modulation of the carrier signal gradually over at least a two-symbol time period.

3. The radio of claim 1, wherein the frequency and timeslot identifier data includes sync data and Coded Digital Control Channel Locator information and said modulator modulates the carrier signal with transmit date, sync data and Coded Digital Control Channel Locator (CDL) information supplied form the system controller during active time slots and modulates the carrier signal only with sync data and CDL information during inactive time slots.

4. The radio of claim 1, wherein said transmitter wirelessly transmits the carrier signal to a mobile station in a Time Division Multiple Access (TDMA) communication system.

5. A method of reducing adjacent and co-channel interference generated by a radio, the radio transmitting a carrier signal having plural time slots designated as active time slots and inactive time slots by a system controller, the method comprising:

modulating the carrier signal with transmit data and with frequency and time slot identifier data during active time slots when the transmit data is supplied by the system controller;

discontinuing modulation of the carrier signal with transmit data during inactive time slots when random bits are supplied by the system controller; and wirelessly transmitting the carrier signal.

6. The method of reducing adjacent and co-channel interference of claim 5, wherein said step of modulating comprises modulating the carrier signal with transmit data, sync data and Coded Digital Control Channel Locator (CDL) information supplied by the system controller and said step of discontinuing modulation comprises modulating the carrier signal only with sync data and CDL information.

7. The method of reducing adjacent and co-channel interference of claim 5, wherein the frequency and timeslot identifier data includes sync data and Coded Digital Control Channel Locator information and said step of modulating comprises modulating the carrier signal with transmit date, sync data and Coded Digital Control Channel Locator (CDL) information supplied by the system controller and said step of discontinuing modulation comprises modulating the carrier signal only with sync data and CDL information.

8. The method of reducing adjacent and co-channel interference of claim 5, wherein the carrier signal is wirelessly transmitted by the radio to a mobile station in a Time Division Multiple Access (TDMA) communication system.

9. An article of manufacture taking the form of a computer-readable medium for reducing adjacent and co-channel interference generated by a radio, the radio transmitting a carrier signal having plural time slots designated as active time slots and inactive time slots by a system controller, the article of manufacture comprising:

a modulation source code segment for causing a computer to modulate the carrier signal with transmit data and with frequency and timeslot identifier data when transmit data is supplied by the system controller during active time slots;

a discontinuation source code segment for causing the computer to discontinue modulation of the carrier signal with transmit data when random bits are supplied from the system controller during inactive time slots; and a transmission source code segment for causing the computer to wirelessly transmit the carrier signals.

10. The article of manufacture of claim 9, wherein the carrier signals are Time Division Multiple Access (TDMA) carrier signals.

* * * * *